United States Patent
Freltoft

(10) Patent No.: US 9,565,334 B2
(45) Date of Patent: Feb. 7, 2017

(54) PHOTO SURVEY USING SMART DEVICE WITH CAMERA

(71) Applicant: ASPEKT R&D A/S, Koge (DK)

(72) Inventor: Tue Freltoft, Koge (DK)

(73) Assignee: Aspekt R&D A/S, Koge (DK)

( * ) Notice: Subject to any disclaimer, the term of this patent is extended or adjusted under 35 U.S.C. 154(b) by 0 days.

(21) Appl. No.: 14/650,062

(22) PCT Filed: Dec. 5, 2012

(86) PCT No.: PCT/DK2012/050444
§ 371 (c)(1),
(2) Date: Jun. 5, 2015

(87) PCT Pub. No.: WO2014/086357
PCT Pub. Date: Jun. 12, 2014

(65) Prior Publication Data
US 2015/0326778 A1    Nov. 12, 2015

(51) Int. Cl.
*H04N 1/32*     (2006.01)
*H04N 5/232*    (2006.01)
*H04N 101/00*   (2006.01)

(52) U.S. Cl.
CPC ...... *H04N 1/32128* (2013.01); *H04N 1/32101* (2013.01); *H04N 5/232* (2013.01);
(Continued)

(58) Field of Classification Search
CPC ............ H04N 5/23222; H04N 5/23229; H04N 5/23206; H04N 5/232; H04N 5/23293; H04N 1/32101; H04N 2101/00; H04N 2201/3225; G06F 3/041
See application file for complete search history.

(56) References Cited

U.S. PATENT DOCUMENTS

2002/0175944 A1* 11/2002 Kolde ................ H04N 5/4403
                                                            715/773
2003/0208395 A1* 11/2003 McClure ............... G07C 13/00
                                                            705/12
(Continued)

OTHER PUBLICATIONS

International Search Report for Application No. PCT/DK2012/050444 mailed on Jul. 19, 2013.
(Continued)

*Primary Examiner* — Shahbaz Nazrul
(74) *Attorney, Agent, or Firm* — Fox Rothschild LLP; Carol E. Thorstad-Forsyth

(57) ABSTRACT

Disclosed is an image capturing device for use in photo surveys, wherein said image capturing device comprises: a camera unit for capturing images; a processing unit for controlling said camera unit; a first shutter release button for activating said camera unit to capture an image of a motive; and a second shutter release button for activating said camera unit to capture an image of a motive. The processing unit, when either said first shutter release button or said second shutter release button is activated, is configured to control said camera unit to capture an image of a motive, and generate an opinion variable associated with said captured image, wherein said opinion variable is for indicating the opinion of a user towards said motive, and wherein said opinion variable is generated dependent on the used shutter release button.

5 Claims, 3 Drawing Sheets

(52) U.S. Cl.
CPC ..... *H04N 5/23206* (2013.01); *H04N 5/23229* (2013.01); *H04N 5/23293* (2013.01); *H04N 2101/00* (2013.01); *H04N 2201/3225* (2013.01)

(56) References Cited

U.S. PATENT DOCUMENTS

| | | | |
|---|---|---|---|
| 2003/0218624 A1 | 11/2003 | Quintana et al. | |
| 2004/0126038 A1 | 7/2004 | Aublant et al. | |
| 2005/0043988 A1* | 2/2005 | Illsley | G07C 13/00 705/12 |
| 2005/0218224 A1* | 10/2005 | Boldin | G07C 13/00 235/386 |
| 2007/0008321 A1* | 1/2007 | Gallagher | G06F 17/30265 345/473 |
| 2007/0244634 A1* | 10/2007 | Koch | G01C 21/00 |
| 2008/0002963 A1 | 1/2008 | Chuang et al. | |
| 2011/0069179 A1 | 3/2011 | Bathiche et al. | |
| 2011/0164128 A1* | 7/2011 | Burgett | A61B 5/1076 348/77 |
| 2011/0276423 A1 | 11/2011 | Davidson | |
| 2012/0030476 A1* | 2/2012 | Chung | G06Q 30/02 713/186 |
| 2012/0050556 A1* | 3/2012 | Hamada | H04N 5/23212 348/220.1 |
| 2012/0249831 A1* | 10/2012 | Porter | H04N 5/23206 348/231.3 |
| 2014/0223329 A1* | 8/2014 | Falaki | G06F 13/00 715/747 |
| 2015/0066641 A1* | 3/2015 | Dudley | G06Q 30/0261 705/14.51 |
| 2015/0378587 A1* | 12/2015 | Falaki | H04L 67/02 715/747 |

OTHER PUBLICATIONS

Padgett et al., "A Picture is Worth . . . ? Photo Elicitation Interviewing With Formerly Homeless Adults" Qual Health Res, 2013, vol. 23, No. 11, pp. 1435-1444, originally published online Oct. 11, 2013.

* cited by examiner

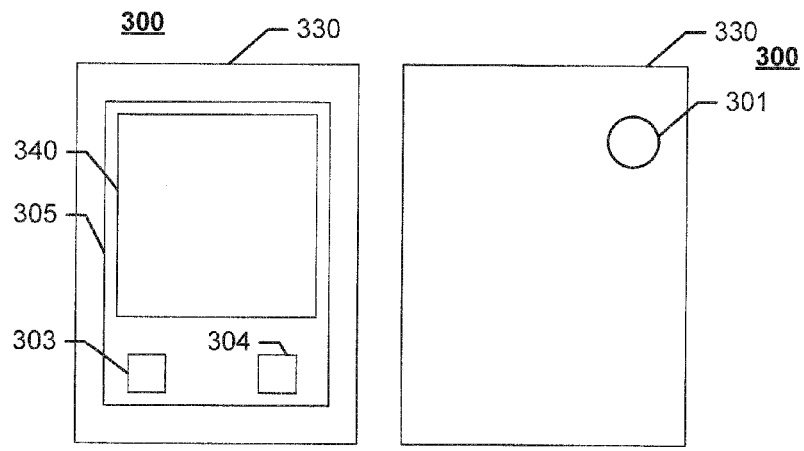
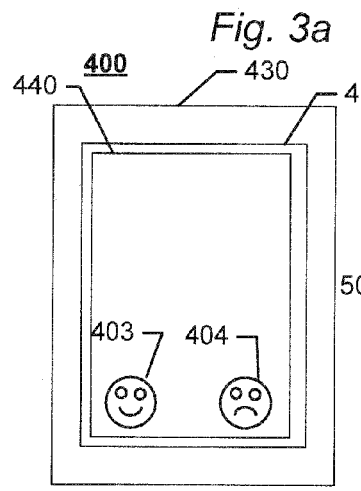
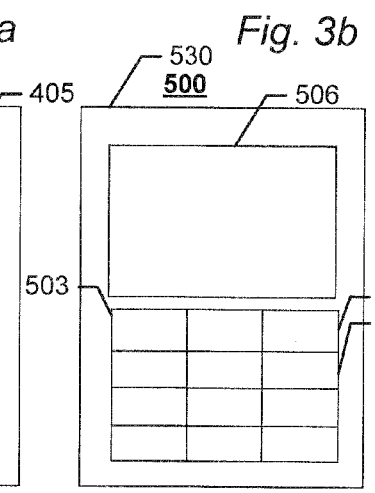
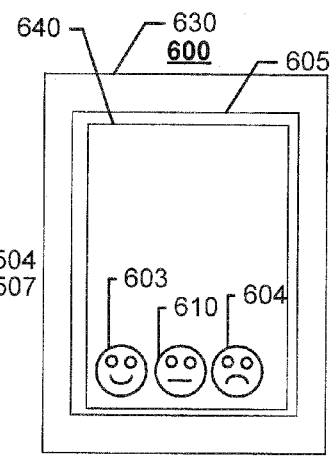
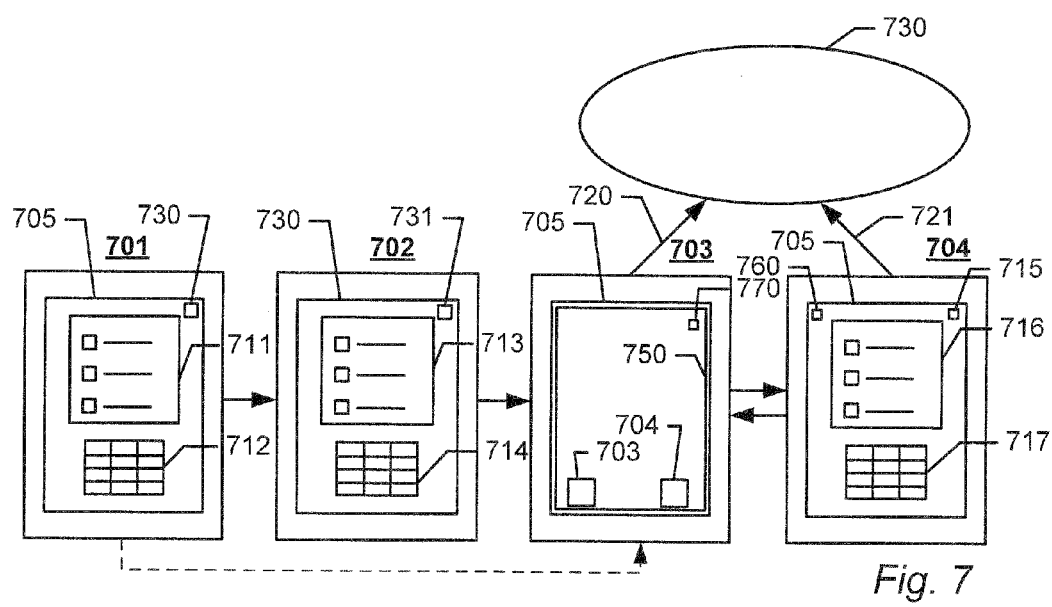

| A | S | Im 1 | | | | Im n | TS | TE | POST | ID |
|---|---|---|---|---|---|---|---|---|---|---|
| | | PF | POS | SB | COM | | | | | |
| 13 | M | 1.jpg | HDDD° MM'SS | :) | | ... | 11.35 | 14.26 | Route.gpx | 10001 |
| 14 | K | 1.jpg | HDDD° MM'SS | :( | "freweklsdf" | ... | 11.37 | 14.35 | Route.gpx | 10002 |
| 14 | K | 1.jpg | HDDD° MM'SS | :) | "kjlygip" | ... | 11.37 | 14.35 | Route.gpx | 10003 |

Fig. 8

PHOTO SURVEY USING SMART DEVICE WITH CAMERA

CROSS REFERENCE TO RELATED APPLICATIONS

This application is the U.S. National Phase filing of PCT International Application No. PCT/DK2013/050444, filed Dec. 5, 2012. The content of the foregoing application is incorporated herein by reference in its entirety.

FIELD

The present invention relates to image capturing devices for use in photo surveys and to a method for performing photo surveys using such devices.

BACKGROUND

User surveys are an important tool for many organizations. User surveys may both be used to develop new products and services, and retain user loyalty. Computers have become an important tool for conducting user surveys. By using computers, participants may be provided with access to a specially designed home page, where they can fill out an electronic questionnaire. This is not only an efficient way of collecting data, but also makes it easier to organize and analyse the results.

US20120030476 discloses a system and a method for automatically collecting opinions. The disclosed method comprises the steps of: distributing, to user terminals, content containing actual metadata corresponding to metadata items required for executing an opinion-collecting service programme, and extracting opinions of users contained in the reply content received from user terminals, and compiling statistics with the extracted opinions. This enables an automatic online collection of user opinions regarding voting, public opinion polls, surveys and other feedback via PCs or portable communication equipment, and automatically compiles statistics with the collected user opinions.

However, the disclosed method is limited to literate participants.

Thus it remains a problem to provide methods for conducting precise user surveys for special groups of participants having limited reading capabilities such as children. Further, it remains a problem to provide devices for use in such methods.

Further, it remains a problem to provide a method for conducting precise user surveys for investigating types of user perception unsuitable for traditional questionnaire based surveys.

SUMMARY

According to a first aspect, the invention relates to an image capturing device for use in photo surveys, wherein said image capturing device comprises:
  a camera unit for capturing images;
  a processing unit for controlling said camera unit;
  a first shutter release button for activating said camera unit to capture an image of a motive, wherein said first shutter release button is operatively connected to said processing unit; and
  a second shutter release button for activating said camera unit to capture an image of a motive, wherein said second shutter release button is operatively connected to said processing unit;
wherein said processing unit, when either said first shutter release button or said second shutter release button is activated, is configured to control said camera unit to capture an image of a motive, and generate an opinion variable associated with said captured image, wherein said opinion variable is for indicating the opinion of a user towards said motive, and wherein said opinion variable is generated dependent on the used shutter release button thereby enabling said image capturing device to capture an image of a motive and simultaneously record an opinion of a user towards said motive.

The proprietor/applicant has recently discovered that participants in photo surveys are influenced by the image generated of a motive, and thus are inclined to rate the image of the motive and not the motive itself. As an example, if the generated image is badly lit participants will on average rate their perception of the motive lower, compared to their rating of the same motive if the generated image is of a high quality. This results in a serious bias in photo survey studies.

Consequently, by providing an image capturing device having a plurality of shutter release buttons as specified above, a user can capture an image of a motive and simultaneously record an opinion towards said motive by choosing a particular shutter release button. This prevents the user from being influenced by the quality of the image. Consequently, a bias is removed resulting in more precise photo surveys.

Additionally, by instantly recording an opinion of a user towards a motive any memory bias is avoided. Furthermore, by using the photo method participants with limited reading capabilities may be included in the surveys.

An image capturing device may be any kind of device suitable for capturing images e.g. a digital camera, a personal computer fitted with a camera unit, a mobile telephone fitted with a camera e.g. a smart phone, or a tablet fitted with a camera. A photo survey may be any form of survey where participants are asked to capture images. A photo survey may be a survey where participants are asked to capture images of motives in an environment and further indicate their perception of said motives e.g. a positive or a negative perception. The first shutter release button and/or second shutter release button may be any type of button e.g. a physical button and/or a virtual button i.e. a virtual button on a touch screen. The first and the second shutter release button may be two distinct areas on a touch screen. Alternatively, the first and the second shutter release button may be a single area on a touch screen where the touch screen is configured to detect a particular gesture on said area i.e. if a vertical movement is detected in said area the first shutter release button may be activated and if a horizontal movement is detected in said area the second shutter release button may be activated. The processing unit may be configured to capture an image with identical camera settings irrespectively of the used shutter release button i.e. irrespectively of whether the first shutter release button or the second shutter release button has been used the same camera settings are used. The opinion variable may simply comprise data indicating the used shutter release button. The image capturing device may link an opinion variables with its associated captured image. The image capturing device may comprise a communication unit. The communication unit may be a wired or wireless communication unit. The communication unit may be a telecommunication unit. The telecommunication unit may allow the image capturing device to connect to telecommunication networks such as the internet, or closed networks with restricted access. The captured image and/or generated opinion variable may be stored on a memory of the image capturing device and/or transferred to another data storage unit e.g. uploaded to a server over the internet.

The image capturing device may comprise more than two shutter release buttons e.g. at least 3, 4, 5, or 10 shutter release buttons.

In some embodiments, said first shutter release button has a positive symbol associated and said second shutter release button has a negative symbol associated.

The positive symbol may be associated with the first shutter release button by being displayed on the first shutter release button or in proximity of the first shutter release button. Further the positive or negative symbols may be in the form of drawings, e.g. emoticons, which support the respondents' decision making process. The shutter release buttons may also reflect a numeric rating scale and/or a semantic scaling using content relevant positive or negative words.

A positive symbol may be a "happy" smiley, a plus sign, or a high integer. Correspondingly, the negative symbol may be associated with the second shutter release button by being displayed on the second shutter release button or in proximity of the second shutter release button. A negative symbol may be an "unhappy" smiley, a minus sign, or a low integer.

Consequently, a user may easily be reminded of the function of the different shutter release buttons.

In some embodiments, said device further comprises a display and an input unit for allowing a user to input data and/or to record verbal statements or comments to the image.

The display and input unit may be provided as two separate units e.g. as a display and one or more input buttons e.g. a keyboard. Alternatively, the display and input unit may be combined in a single unit such as a touch screen.

In some embodiments, said display is a touch screen and wherein said first shutter release button is a first element displayed on said touch screen and said second shutter release button is a second element displayed on said touch screen.

In some embodiments, said processing unit is configured to perform the following steps before allowing said camera unit to capture images:
   control said display to display a personal information form;
   receive personal information inputted into said personal information form by said user using said input unit;
   store said received personal information in a background variable;
wherein the image(s) subsequently captured by said user is/are associated with said background variable.

The personal information form may request the user to input at least 1 or at least 2 of the following types of personal data: sex, age, home address, income, occupation, marital status, memberships, purposes of visit, number an character of the persons in the respondent group, self experienced health condition, self experienced mental condition, and/or self experienced training condition. The background variable may be stored on a memory of the image capturing device and/or transferred to another data storage unit e.g. uploaded to a server over the internet. The image capturing device may also be configured to retrieve personal information from other sources than the respondent e.g. they may be obtained from a external database accessed by the image capturing device. The retrieved personal information may additionally be stored in the background variable.

Consequently, more detailed statistical analysis is possible on the retrieved data, e.g. when data from a plurality of participants is retrieved the percentage of positive images may be calculated for different age groups.

In some embodiments, said processing unit is configured to perform the following steps after an image has been captured:
   control said display to display a comment form
   receive comments associated with the captured image inputted into said comment form by said user using said input unit;
   store said received comments in an image comment variable associated with said captured image.

The received comments may be written comments and/or verbal comments e.g. the input unit may be a keyboard and/or a microphone.

This allows the user to provide additional comments to his/her opinion towards the motive.

The image comment variable may be stored on a memory of the image capturing device and/or transferred to another data storage unit e.g. uploaded to a server over the internet.

In some embodiments, said image capturing device further comprises a position estimation unit for estimating the position of said image capturing device, wherein said position estimation unit is communicatively coupled to said processing unit, and wherein said processing unit is further configured to, when either said first shutter release button or said second shutter release button is activated, receive a position estimate of said image capturing device from said position estimation unit and store the position estimate in a position estimate variable associated with said captured image.

The position estimation unit may be any type of unit capable of position estimation such as a GPS unit, a WIFI based position estimation unit, or a unit based on trilateration between radio towers e.g. base stations in a mobile telecommunication network.

In some embodiments, said image capturing device is further configured to obtain auxiliary data and store auxiliary data in an auxiliary variable. Auxiliary data may be one or more of the following: photo capture settings, light levels, temperature, humidity, and/or time stamps.

In some embodiments, said device further comprises a communication unit, wherein said device is configured to upload to a server one or more of the following:
   captured image(s); and/or
   opinion variable(s); and/or
   background variable(s); and/or
   image comment variable(s); and/or
   position estimate variable(s); and/or
   auxiliary variable(s)

The variables may be uploaded directly to a remote server after they have been generated or they may be stored locally on a memory unit of the image capturing device and then subsequently uploaded.

According to a second aspect the invention relates to a data storage medium comprising a computer readable code wherein said computer readable code is configured to programme a smart device comprising a camera unit, a processing unit, and an input unit to become a device as described in relation to the first aspect of the invention.

A data storage medium may be a transportable medium such as a DVD, USB drive, or the like. Alternatively, a data storage medium may be a hard drive on a computer server connected to a computer network. A smart device may be any device comprising a camera unit, a processing unit, and an input unit such as a smart phone or a tablet. Thus, the computer readable code may be an App configured to programme said smart device to become a device as described in relation to the first aspect of the invention e.g. an Apple® IOS app, a Windows® Mobile App, and/or a Google® Android App. Alternatively, the computer readable code may be a web page configured to programme said smart device to become a device as described in relation to the first aspect of the invention e.g. a web app.

According to a third aspect, the invention relates to a computer data signal embodied in a carrier wave and representing sequences of instructions which, when executed by a processor of a smart device comprising a camera unit and an input unit, programmes said smart device to become a device as described in relation to the first aspect of the invention.

According to a fourth aspect the invention relates to a method for capturing an image of a motive and record an opinion of a user towards said motive, wherein said method comprises the steps of:
 capturing an image of a motive; and
 generating an opinion variable associated with said captured image for indicating the opinion of said user towards said motive;
wherein said opinion variable is generated before the user is presented with the captured image.

Consequently, the user is prevented from being influenced by the quality of the captured image.

In some embodiments, the step of capturing an image is performed in response to the user activates either a first shutter release button or a second shutter release button, and wherein the opinion variable is generated dependent on the used shutter release button, and wherein said user is instructed that said first shutter release button is for recording a positive opinion towards said motive, and that said second shutter release button is for recording a negative opinion towards said motive.

A device as described in relation to the first aspect of the invention may be used in the method.

In some embodiments, the opinion variable is generated without any additional user inputs besides the initial push on the first shutter release button or the second shutter release button.

In some embodiments, the method, after an image has been captured, further comprises the steps of:
 display a comment form;
 receive comments associated with the captured image inputted into said comment form by said user;
 store said received comments in an image comment variable associated with said captured image.

In some embodiments, the method in response to the user activates either the first shutter release button or the second shutter release button further comprises the steps of:
 receiving a position estimate;
 storing said position estimate in a position estimate variable associated with said captured image.

According to a fifth aspect the invention relates to a method for performing photo surveys of an environment, comprising the steps of;
 providing each of a plurality of participants with access to an image capturing device as disclosed in relation to the first aspect of the invention;
 providing each of said plurality of participants with instructions for performing said photo survey; and
 collecting data from said image capturing devices provided to said plurality of participants.

An environment may be a delimited area such as a school, a university, a public park, an amusement park, a part of a neighborhood, a city, or a country. The instructions may instruct the participants to capture images of a particular number of motives in a particular defined environment, and indicate an opinion towards said motives by choosing a shutter release button to use.

In some embodiments, the step of providing a plurality of participants with access to an image capturing device comprises either;
 supplying an image capturing device as disclosed in relation to the first aspect of the invention to the plurality of participants; and/or
 providing the plurality of participants with access to a data storage medium comprising a computer readable code wherein said computer readable code is configured to programme a smart device comprising a camera unit, a processing unit, and an input unit to become a device as disclosed in relation to the first aspect of the invention.

A device may be supplied to the plurality of participants by simply being handed over to the participants. The plurality of participants may be provided with access to a data storage medium directly by being handed over a data storage medium and/or indirectly by being given a link to a data storage medium such as a link to a web server e.g. a link that when activated downloads an app to a smart device.

Data may be collected by collecting image capturing devices after the participants have finished their task. Alternatively or additionally, data may be collected by receiving the data from the image capturing devices. Data may be transmitted wired or wireless over a short distance or over a long distance using a telecommunication network e.g. the internet.

In some embodiments, the step of providing each of a plurality of participants with access to an image capturing device comprises;
 providing each of a plurality of participants with access to an image capturing device as disclosed in relation to the first aspect of the invention; having a position estimation unit.

In some embodiments, the method further comprises the step of
 presenting the collected data on a map of the environment.

The data may be presented on a map by aggregating opinion variables associated with images taken in geographical proximity into a single aggregated opinion variable, e.g. the respective percentage of positive opinion variables and negative opinion variables may be calculated. The aggregated opinion variables may be presented on the map by a number or symbol e.g. a particular percentage of positive opinion variables.

According to a sixth aspect the invention relates to a system comprising an image capturing device as disclosed in relation to the first aspect of the invention, and instructions for instructing a user that said first shutter release button is for capturing an image of a motive and indicating a positive opinion towards said motive, and said second shutter release button is for capturing an image of a motive and indicating a negative opinion towards said motive.

Here and in the following, the terms 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof.

Here and in the following, it should be noted that the opinion variables, captured images, background variables, image comments variables, and position estimation variable may be combined into one or more combined variables.

Here and in the following an "image" may be defined either as a single frame photographic picture or as a series of frames in a sequence, which may or may not be collected into a video clip.

The different aspects of the present invention can be implemented in different ways including image capturing device, and method utilizing such image capturing device described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims.

Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further elucidated by the following illustrative and non-limiting detailed description of embodiments of the present invention with reference to the appended drawings, wherein:

FIGS. 3a-b show an image capturing device according to an embodiment of the present invention.

FIG. 4 shows an image capturing device according to an embodiment of the present invention.

FIG. 5 shows an image capturing device according to an embodiment of the present invention.

FIG. 6 shows an image capturing device according to an embodiment of the present invention.

FIG. 7 illustrates the functioning of an image capturing device according to an embodiment of the present invention.

FIG. 8 shows a schematic drawing of a database comprising data from a photo survey, according to an embodiment of the present invention.

DETAILED DESCRIPTION

In the following description, reference is made to the accompanying figures, which show by way of illustration how the invention may be practiced.

Figure 1:
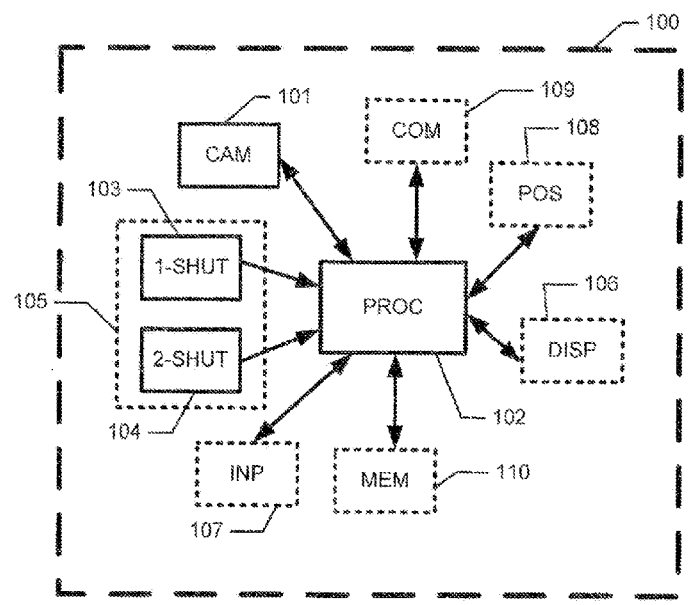
FIG. 1 shows a schematic drawing of an image capturing device according to an embodiment of the present invention.

FIG. 1 shows a schematic drawing of an image capturing device 100 according to an embodiment of the present invention. The image capturing device 100 comprises a camera unit 101, a processing unit 102, a first shutter release button 103, and a second shutter release button 104. The camera unit 101, the first shutter release button 103, and the second shutter release button 103 are operatively connected to the processing unit 102. The processing unit 102, in response to either said first shutter release button or said second shutter release button is activated, control said camera unit 101 to capture an image of a motive, and generate an opinion variable associated with said captured image. The opinion variable is generated dependent on the used shutter release button and is used to indicate the opinion of a user towards the motive in the captured image. Thus, by instructing a user that the first shutter release button 103 is for capturing an image of a motive and indicating a positive opinion towards said motive, and said second shutter release button 104 is for capturing an image of a motive and indicating a negative opinion towards said motive, the user can by properly selecting either the first shutter release button 103 or the second shutter release button 104 capture an image of a motive and at the same time store an opinion variable that indicates the user's opinion towards the motive. This prevents the user from being influenced by the captured image when rating the motive.

The image capturing device may optionally further comprise a display 106 105, an input unit 107 105, a position estimation unit 108, an internal memory 110, and a communication unit 109. The display and input unit may be combined in a single unit 105 e.g. a touch screen or they may be provided as separate units 106 107.

Figures 2A, 2B:
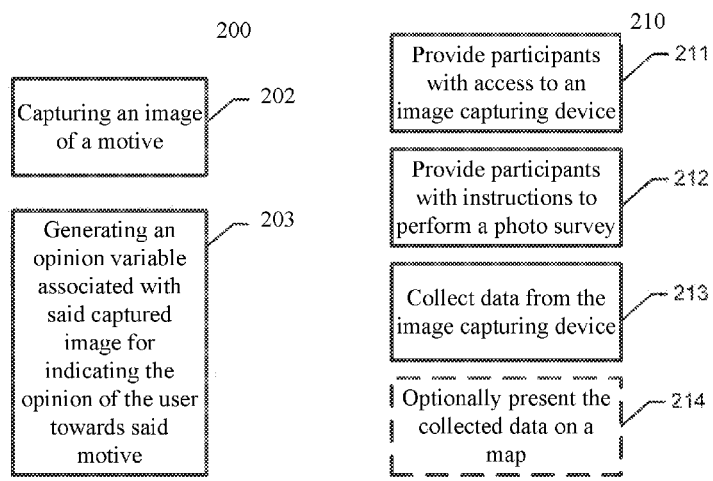
FIG. 2a shows a flowchart of a method for capturing an image of a motive and record an opinion of a user towards said motive according to an embodiment of the present invention.
FIG. 2b shows a flowchart of a method for performing photo surveys of an environment according to an embodiment of the present invention.

FIG. 2a shows a flowchart of a method for capturing an image of a motive and record an opinion of a user towards said motive 200 according to an embodiment of the present invention. The method comprises the steps of capturing an image of a motive 202; and generating an opinion variable associated with said captured image for indicating the opinion of said user towards said motive 203, where the opinion variable is generated before the user is presented with the captured image. Consequently, the user is prevented from being influenced by the quality of the captured image.

FIG. 2b shows a flowchart of a method for performing photo surveys of an environment 210 according to an embodiment of the present invention. In the first step of the method 211, a plurality of participants are provided with access to an image capturing device as disclosed in relation to the first aspect of the invention and/or as explained in relation to FIG. 1. Participants may be provided with access by being supplied directly with an image capturing device e.g. handed an image capturing device. Alternatively/Additionally the participants may be provided with access to a data storage medium comprising a computer readable code wherein said computer readable code is configured to programme participant's own smart devices to become a device as disclosed in relation to the first aspect of the invention and/or as explained in relation to FIG. 1. Next, in step 212 the participants are provided with instructions to perform said photo survey. Finally, in step 213 data is collected from the image capturing device provided to the participants.

An environment may be a delimited area such as a school, a university, a public park, an amusement park, a part of a neighborhood, a city, or a country. The instructions may instruct the participants to capture images of a particular number of motives in a particular defined environment, and indicate an opinion towards said motives by selecting a particular shutter release button. The method may optionally further comprise the step of presenting the collected data on a map of the environment 214.

FIGS. 3a-b show an image capturing device according to an embodiment of the present invention. FIG. 3a shows a front view and FIG. 3b shows a back view. The image capturing device 300 comprises a touch screen 305 and a camera unit 301 arranged in a housing 330. The housing 330 further comprises a processing unit (not shown). The image capturing device 300 may be a smart device such as a smart phone or a tablet. The image capturing device is shown in a state where it is ready to capture images and generate opinion variables. The touch screen 305 comprises a display zone 340 configured to display what the camera unit 301 sees, a first shutter release button 303, and a second shutter release button 304. The first shutter release button 303 and the second shutter release button 304 function in the same way as described in relation to the first aspect of the invention and FIG. 1. Thus, if the user touches the touch screen 305 at the area of the first shutter release button 303, the processing unit controls the camera unit 301 to capture an image of a motive and further generates an opinion variable associated with the captured image, where the opinion variable indicates that the user has a positive opinion towards the motive in the captured image. Alternatively, if the user touches the touch screen 305 at the area of the second shutter release button 304, the processing unit controls the camera unit 301 to capture an image of a motive and further generates an opinion variable associated with the captured image, where the opinion variable indicates that the user has a negative opinion towards the motive in the captured image.

FIG. 4 shows a front view of an image capturing device 400 according to an embodiment of the present invention. The image capturing device 400 comprises a touch screen 405 and a camera unit (not shown) arranged in a housing 430. The camera unit may be arranged at the back of the device in a similar manner as the device shown in FIGS. 3a-b. The housing 430 further comprises a processing unit (not shown). The touch screen 305 comprises a display zone 440 configured to display what the camera unit sees, a first shutter release button 403, and a second shutter release button 404. In this embodiment the first shutter release button 403 has a positive symbol associated and the second shutter release button 404 has a negative symbol associated. The device may function in a similar manner as the device shown in FIGS. 3a-b.

FIG. 5 shows a front view of an image capturing device 500 according to an embodiment of the present invention. The image capturing device 500 comprises a display 506, an input unit 507, a processing unit (not shown) and a camera unit (not shown) arranged in a housing 530. The camera unit may be arranged at the back of the device in a similar manner as the device shown in FIGS. 3a-b. The display in this embodiment may preferably be a conventional screen, it may, however, also be a touch screen. The input unit 507 is a 4 by 3 keyboard. When the device is in a state where it is ready to capture images and generate opinion variables, a first button of the input unit 507 functions as a first shutter release button 503 and a second button of the input unit 507 functions as a second shutter release button. The first shutter release button 503 and the second shutter release button 504 function in the same way as described in relation to the first aspect of the invention and FIG. 1. Thus, if the user activates the first shutter release button 503, the processing unit controls the camera unit to capture an image of a motive and further generates an opinion variable associated with the captured image, where the opinion variable indicates that the user has a positive opinion towards the motive in the captured image. Alternatively, if the user activates the second shutter release button 504, the processing unit controls the camera unit to capture an image of a motive and further generates an opinion variable associated with the captured image, where the opinion variable indicates that the user has a negative opinion towards the motive in the captured image.

FIG. 6 shows a front view of an image capturing device 600 according to an embodiment of the present invention. The image capturing device 600 comprises a touch screen 605 and a camera unit (not shown) arranged in a housing 630. The camera unit may be arranged at the back of the device in a similar manner as the device shown in FIGS. 3a-b. The housing 630 further comprises a processing unit (not shown). The touch screen 605 comprises a display zone 640 configured to display what the camera unit sees, a first shutter release button 603, a second shutter release button 604, and a third shutter release button 610. In this embodiment the first shutter release button 603 has a positive symbol associated, the second shutter release button 604 has a negative symbol associated, and the third shutter release button 610 has a neutral symbol associated. The first shutter release button 603 and the second shutter release button 604 functions in the same way as described in relation to the first aspect of the invention and FIG. 1. Thus, if the user activates the first shutter release button 603, the processing unit controls the camera unit to capture an image of a motive and further generates an opinion variable associated with the captured image, where the opinion variable indicates that the user has a positive opinion towards the motive in the captured image, and if the user activates the second shutter release button 604, the processing unit controls the camera unit to capture an image of a motive and further generates an opinion variable associated with the captured image, where the opinion variable indicates that the user has a negative opinion towards the motive in the captured image. Correspondingly, if the user activates the third shutter release button 610, the processing unit controls the camera unit to capture an image of a motive and further generates an opinion variable associated with the captured image, where the opinion variable indicates that the user has a neutral opinion towards the motive in the captured image.

FIG. 7 illustrates the functioning of an image capturing device according to an embodiment of the present invention. The image capturing device comprises a touch screen 705, a processing unit (not shown), a camera unit (not shown), and communication unit (not shown). In a first state 701, the image capturing device is configured to display an input form 711, and a keyboard 712 for allowing a research assistant to input login details and survey information specifying a specific photo survey. In the first state 701, the image capturing device can be programmed for use in a specific survey. After all relevant information has been inputted, the research assistant may push an activation button 730, setting the image capturing device in a second state 702 (or alternatively directly in a third state as explained below). When the image capturing device is in the second state 702, it is ready to be provided to a participant in the specific photo survey. In the second state 702, the image capturing device is configured to display a personal information form 713, and a keyboard 714. In this state the participant in the photo survey is requested to input personal information. This enables further statistical analysis to be performed on the collected data, e.g. the percentage of "positive" images captured for men and women respectively may then be calculated. After the participant has entered the personal information, a button 731 may be pushed. This results in that the received personal information is stored in a background variable, and that the image capturing device is set in a third state 703. In the third state 703, the image capturing device is ready to capture images. In the third stage 703, the image capturing device displays a first shutter release button 703, a second shutter release button 704, and a display zone 750 configured to display what the camera unit sees. In the third state 703 the image capturing device may function in a similar manner as the image capturing device described in relation to the first aspect of the invention, FIG. 1 or FIGS. 3a-b. Thus, in the third state 703 the image capturing device enables a participant to capture images of motives and generate opinion variables for indicating his/her opinion towards the motives. After a participant has captured an image of a motive by pushing either the first shutter release button 703 or the second shutter release button 704, the image capturing device is set to a fourth state 704. In the fourth state 704, the image capturing device is configured to display a comment form 716, and a keyboard 717. In this state the participant in the photo survey is provided with the opportunity to input additional comments to the motive. After the participant has inputted additional comments, a comment variable is stored. Next, the participant may push a first button 760 resulting in that the image capturing device is set back to the third state 703, thereby allowing the participant to capture additional images. Alternatively, the participant may push a second button 715 resulting in that the participant's contribution to the particular photo survey ends. Next, all captured images and generated variables are transferred 721 by the communication unit to an external data storage facility 730 i.e. a server and/or the image capturing device is returned to a research assistant. Alternatively, when the image capturing device is in the third state 703, the participant may end his/her contribution by pushing a button 770, whereby all captured images and generated variables are transferred 720 by the communication unit to an external data storage facility 730 i.e. a server and/or the image capturing device is returned to a research assistant. For particular photo surveys, the second state 702 and/or the fourth state 704 may be left out i.e. if personal information and/or further comments are not needed. Further, it should be noted that when participants in an photo survey are provided with access to an image capturing device by being provided with access to a link on a server allowing them to download an app that programmes their own smart device to become an image capturing device as disclosed in relation to the first aspect of the invention, their own programmed smart device may be directly in the second state 702, in the first state 701 allowing the users to specify the specific photo survey themselves, or in the third state 703.

In the following a method of performing photo surveys according to an embodiment of the present invention will be discussed. As an example the authority responsible for public parks in a city may want to perform a survey to determine user satisfaction with a particular public park. The authority may want to get answers to the following questions: What is the general user satisfaction? What is the user satisfaction for different groups? Which areas of the park are most popular? Which areas of the park are least popular?

To answer these questions the authority may select a number of park users as participants in a photo survey, and provide the participants with access to an image capturing device as described in relation to the first aspect of the invention or FIG. 1 or FIGS. 3-7. Participants may be provided with access to an image capturing device by being supplied with an image capturing device e.g. research assistants may stand at an entry of the park and hand over image capturing devices to participants. Alternatively, participants may be provided with access to an App that programmes their own smart device to become an image capturing device, e.g. participants may be provided with access to a link, e.g. a poster may be set up at an entry of the park providing participants with access to a link. Next, participants are provided with instructions to perform the photo survey. The instructions may instruct the users to capture images of motives in the park, and indicate their opinion towards the motives by selecting a particular shutter release button. The instructions may be provided by research assistance, by information displayed on the image capturing devices, or by a poster. Next, after participants have performed the survey, data from the image capturing devices is collected. The collected data may be organized in a database as shown in FIG. 8.

In the database each participant is represented by a row. In this example three participants are shown 801 802 803. The two first columns from the left 804 805 represent personal information of the participants, thus for each participant the background variables is stored there. The first column 804 represents the participant's age and the second column 805 represent's the participant's sex. In this example the first participant 801 is a thirteen year old male, the second participant 802 is a fourteen year old female, and the third participant 803 is a fourteen year old female. The third column from the left 806 represents all information related to the first captured image for each participant. The third column 806 comprises a number of sub columns 810 811 812 813, where the first captured image for each participant is stored in the first sub column 810, the position estimate variable associated with the first captured image is stored in the second sub column 811, the opinion variable associated with the first captured image is stored in the third sub column 812, and the comment variable associated with the first captured image is stored in the fourth sub column 813. It can be seen that the first and third participant 801 803 have positive opinion towards the motive in their respective first image, whereas the second participant 802 has a negative opinion towards the motive in his/her first image. The fourth column 807 represents the last captured image for the participant that has captured the largest number of images. For simplicity only a single image column 806 is shown in FIG. 8. However, in reality as is obvious to the skilled person, the database comprises at least a number of image columns corresponding to the highest number of images captured by a participant in the photo survey. The fifth and sixth column 808 809 represent the start time and stop time for the photo survey for each participant. The seventh column 820 represents for each participant the complete route which the participant has moved, e.g. walked through the park. The seventh column 821 represents an ID of each participant. The ID may be anonymised.

Returning to exemplary photo survey of the public park described above, the collected data may be used to calculate: the respective percentage of positive and negative images for all participants, the respective percentage of positive and negative images for female participants, the respective percentage of positive and negative images for male participants, the respective percentage of positive and negative images for children, and the respective percentage of positive and negative images for adults.

Further, the collected data may be represented on a map of the park. This may be done by aggregating opinion variables associated with images taken in geographical proximity into a single aggregated opinion variable e.g. the respective percentage of positive opinion variables and negative opinion variables may be calculated. The aggregated opinion variables may be presented on a map of the park by a number, symbol or colour e.g. a particular percentage of positive opinion variables. The generation of aggregated opinion variables may done at predetermined points on the map e.g. a map of the park may be divided by 5×5 grid and for each element in the grid a aggregated opinion variable may be calculated. Alternatively, points on the map where aggregated opinion variables are calculated may be determined dynamically e.g. using a cluster analysis.

This allows the park authority to determine which areas of the park are most popular, and which areas of the park are least popular.

Although some embodiments have been described and shown in detail, the invention is not restricted to these, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for performing a photo survey of an environment wherein said photo survey is a survey where a plurality of participants are asked to capture images of motives in an environment and further indicate their opinion of said motives, wherein each participant has a smart device comprising a camera unit, a processing unit, and an input unit and each participant is provided with access through their respective smart device to a data storage medium comprising a computer readable code wherein said computer readable code is configured to programme each smart device to:

display on a display instructions for performing said photo survey;

control using said processing unit said camera unit to capture an image of a motive, when either a first shutter release button or a second shutter release button is activated;

generate using said processing unit an opinion variable associated with said captured image, when either said first shutter release button or said second shutter release button is activated, wherein said opinion variable is for indicating the opinion of the participant towards said motive, and wherein said opinion variable is generated dependent on the used shutter release button, whereby a participant can capture an image of a motive and simultaneously record an opinion towards said motive by choosing a particular shutter release button; and transfer all captured images and generated opinion variables to a server;

wherein the instructions for performing said photo survey displayed on the display of each smart device instruct the participants that said first shutter release button is for recording a positive opinion towards a motive and that said second shutter release button is for recording a negative opinion towards a motive; and wherein the captured images and the generated opinion variables on the server, transferred from the smart device of each participant, are organized in a database.

2. The method according to claim 1, wherein said first shutter release button has a positive symbol associated and said second shutter release button has a negative symbol associated.

3. The method according to claim 2, wherein said display is a touch screen and wherein said first shutter release button is a first element displayed on said touch screen and said second shutter release button is a second element displayed on said touch screen.

4. The method according to claim 1, wherein said computer readable code is additionally configured to programme each smart device to:

display on the display a comment form after an image has been captured;

receive comments associated with the captured image inputted into said comment form by said user using said input unit;

store said received comments in an image comment variable associated with said captured image.

5. The method according to claim 1, wherein the smart device of each participant further comprises a position estimation unit, and wherein said computer readable code is additionally configured to programme each smart device to:

generate using said processing unit a position estimate variable associated with said captured image when either said first shutter release button or said second shutter release button is activated;

wherein said position estimate variable comprises a position estimate of said image capturing device received from said position estimate unit.

* * * * *